Feb. 13, 1968    G. D. ROBERTS    3,368,433
QUICK RELEASABLE NUT
Filed Nov. 24, 1965    2 Sheets-Sheet 1
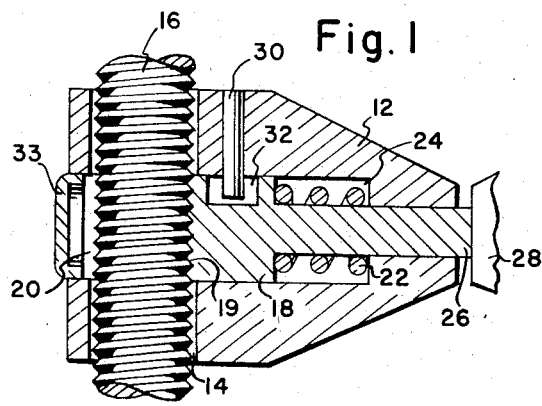
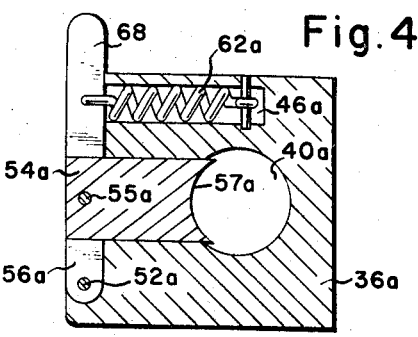
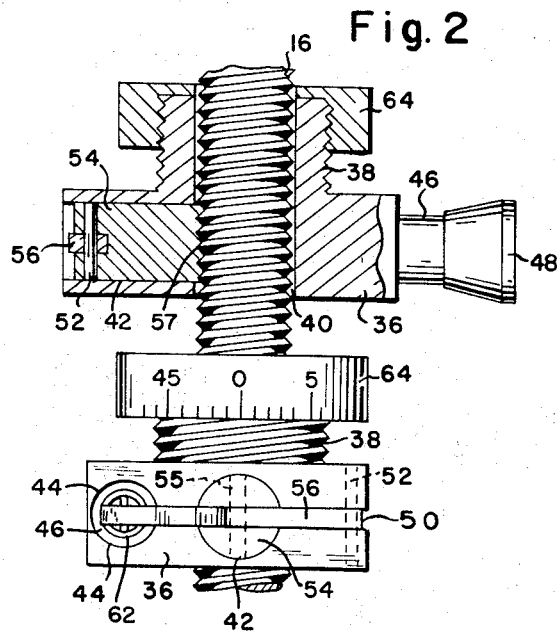
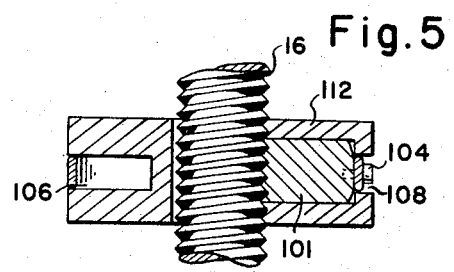
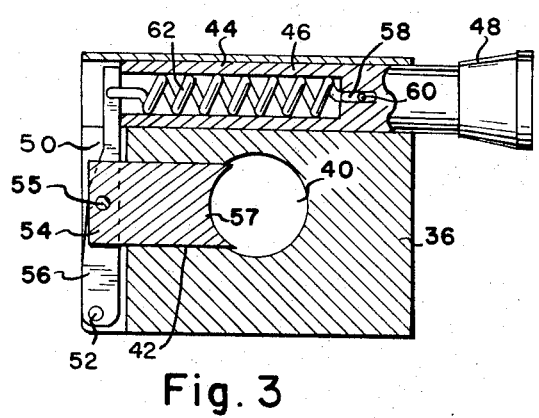
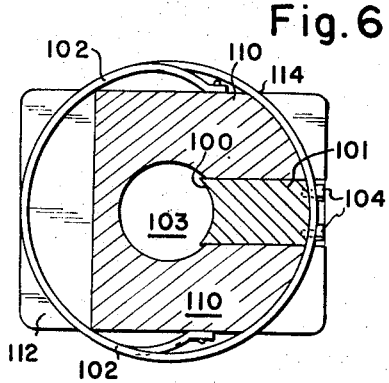
INVENTOR
GEOFFREY D. ROBERTS
BY
Pearson + Pearson
ATTORNEYS

United States Patent Office 3,368,433
Patented Feb. 13, 1968

3,368,433
QUICK RELEASABLE NUT
Geoffrey D. Roberts, Concord, Mass., assignor to Model Shop Associates Inc., Sudbury, Mass., a corporation of Massachusetts
Filed Nov. 24, 1965, Ser. No. 509,477
2 Claims. (Cl. 82—23)

ABSTRACT OF THE DISCLOSURE

A quick release nut of compact size is slidably mounted on the feed screw of a machine tool with a cylindrical threaded block slidable in the nut and normally spring biased into threaded engagement with the feed screw threads. A push button projects from the nut, while wholly within the confines of the nut is a hollow cylindrical pusher element which actuates the free end of a lever arm pivoted to the block and body. The tension spring and pusher cylinder are co-axial, both on the same side of the block pivot, and the lever fulcrum pivot is on the other side of the block pivot.

---

The present invention relates to a quick-releasing nut. More particularly the instant invention relates to a nut for rapidly making gross adjustments in the position of threadably mounted apparatus.

There has long been a need for a simple, inexpensively manufactured, but durable and easily manipulated, nut for making gross adjustments in position of threadably mounted machine tools or their accessories such as drill presses and the like. For example, in drill presses such a nut can be conveniently utilized to raise and lower the drill press over the work piece. Such adjustments are often required because of, for example, changes in the drill being used or changes in the position of the work piece being drilled. Although apparatus for this purpose has been developed from time to time, such apparatus has been used primarily on only very expensive machines such as lathes or never commercially utilized at all. The problems encountered in the prior art and which, in large part, accounted for this limited use were that the apparatus was too cumbersome in use or too expensive to manufacture to justify its production.

Accordingly, it is an object of the present invention to provide a nut of compact size for quickly releasing the threadable engagement of a screw and apparatus mounted thereon.

It is another object of the present invention to provide an easily manipulated, compact, quick-releasable nut of relatively inexpensive manufacture for use in making gross adjustments in the position of threadably mounted equipment.

It is a further object of the invention to provide a compact, quick-releasable nut, independent of attachment to a machine tool and mounted on a feed screw of the machine tool.

Other objects of the invention are in part obvious and, in part set forth below.

The aforesaid objects have been achieved by the construction of a novel quick-release nut comprising a body having a smooth bore therein for receiving a screw such as a feed screw and a recess in the body which recess intercepts the bore. The recess receives a retractable and threaded block which is biased for slidable movement in the aforesaid recess which movement can be used to selectively engage or release the threadable block from engagement with the screw in the aforesaid bore. The term "nut" is used herein in its dictionary meaning as designating a perforated block, usually a small piece of metal of square or hexagonal section, with an internal, or female, screw thread, used on a bolt or screw for tightening or holding something or for transmitting motion.

In the specification and in the accompanying drawings is described and shown an illustrative embodiment of the present invention; modifications thereof are indicated, but it is to be understood that these are not intended to be exhaustive nor limiting of the invention, but on the contrary are given for purposes of illustration in order that others skilled in the art may fully understand the invention and the manner of applying it in practical applications.

The various objects, aspects, and advantages of the present invention will be more fully understood from a consideration of the specification in conjunction with the accompanying drawings, in which:

FIGURE 1 is a section in elevation of a compact quick release nut of the invention showing the functional relationship thereof to a feed screw such as used on a drill press.

FIGURE 2 is an elevational view showing at the top thereof a section of a quick-release nut according to the invention and toward the bottom thereof an elevational view of the same nut turned 90° and with certain parts removed for clarity of showing.

FIGURE 3 is a plan view partially in section of the nut shown in FIGURE 2.

FIGURE 4 is a plan view partially in section of still another quick-release nut somewhat similar to that shown in FIGURES 2 and 3.

FIGURE 5 is a section in elevation of a quick-release nut wherein a spring is used for a dual purpose.

FIGURE 6 is a plan view in section of the quick-release nut shown in FIGURE 5.

Figure 7:
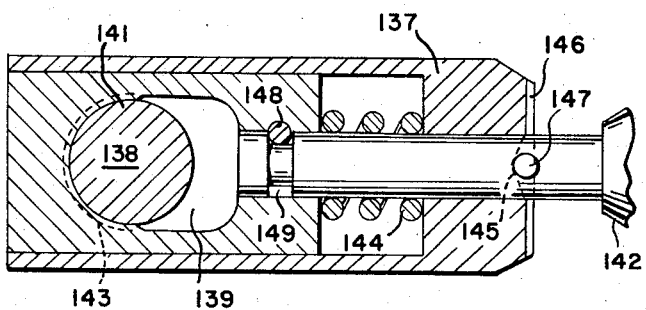
FIGURE 7 is a plan view of still another quick-release nut, the device being similar to the device of FIGURE 1 and shown partly in section.

Referring to FIGURE 1, it is seen that a metal body 12 has two cylindrical, smooth-walled bores therein normal one to the other and in the same vertical plane. In the vertical bore 14 is feed screw 16. The feed screw is attached to a machine tool which is not shown for the purposes of achieving clarity in the description of the invention, but many such applications for these feed screws are known to those skilled in the art and further elaboration of the uses thereof is believed to be unnecessary, the metal body 12 is independent of attachment to the machine tool frame and is mounted on the feed screw 16, as shown, to serve in its capacity as a nut.

Resuming the description of FIGURE 1, it is seen that retractable cylindrical block 18, having a terminally threaded portion 19, is mounted in elongated recess 20 for biased positioning against screw 16. Said biased positioning is maintained by coiled spring 22 which is inserted in recess 20 around neck 26 of block 18 and bears on one end thereof against block 18 and on the other end thereof against shoulders 24 of body 12. Neck 26 extends outwardly of body 12 and is terminated with a handle 28.

A set screw 30 extends through body 12 into block recess 32 to hold block 18 in position during assembly of the apparatus, to keep it from rotating, and also to limit movement of the block to a practical range of reciprocal movement, said range determined by the dimension of recess 32 normal to the axis of set screw 30.

Closure member 33 seals an end of recess 20, which end was advantageously open during assembly of the apparatus.

In operation, then, the apparatus shown in FIGURE 1 can be utilized as follows:

Body 12 would rest on a stop member of a machine tool keeping feed screw 16 in a certain vertical position.

Assume the machine tool to be a drill press. When it becomes desirable to change from a drill having about an eight-inch length to a drill having a four-inch length, the drill press could be released for rapid downward movement to bring the shorter drill tip into contact with the work piece by pulling handle 28 to release block 18 from engagement with feed screw 16 and thus from any engagement with the stop mechanism.

Referring to FIGURES 2 and 3, a different embodiment of the invention is seen wherein body 36 comprises an integral threaded annular collar 38 forming, with body 36, a path for smooth-walled cylindrical axial bore 40 through which a feed screw 16 can be slidably passed. Body 36 also comprises a cylindrical, smooth-walled, block-receiving bore, or recess, 42 having an axis normal to the axis of bore 40 and also includes a cylindrical, smooth-walled, spring-receiving bore 44 or cavity, having an axis parallel to the block-receiving recess 42 in which hollowed operating cylinder 46 is slidable. A push button 48 projects from body 12 and is attached to the outer end of hollowed cylinder 46 to facilitate its slidable movement in cavity 44. Recess 42 and cavity 44 are connected by a horizontal slot 50 which runs from cavity 44 through recess 42 terminating proximate the location of pivot pin 52. Into recess 42 is slidably fitted a cylindrical block 54 terminating in arc-shaped thread segments 57 which may be meshed with the threads of screw 16 when the block is biased thereagainst.

Pivotally attached to block 54 with block pivot pin 55 is lever arm 56 which is held in slot 50 by further pivoted attachment, at one end thereof to pivot pin 52. This arrangement keeps block 54 from rotating. The free opposite end of lever arm 56 is abutted by the inner end of operating cylinder 46. Cylinder 46 has therein an elongated slot 58 through which limit pin 60, held snugly in body 36 is passed. Within operating cylinder 46, a tension spring 62 is attached at one end thereof to lever arm 56 and at the other end to pin 60. Such attachment shown clearly in FIGURE 3 assures arm 56 will be biased for reciprocal biased movement in cavity 44.

In operation, the nut shown in FIGURES 2 and 3 may be mounted on a feed screw of a drill press as described in reference to the apparatus of FIGURE 1 and quickly released to allow rapid travel of the screw by pressing button 48 and thereby causing the operating cylinder 46 to pivot lever arm 56 to retract block 54 and threads thereof from engagement with screw 16.

A particularly advantageous feature of the nut shown in FIGURES 2 and 3 is its compact size which allows its use on the feed screws of machine tools wherein but limited space is available for mounting and operating such a quick-release structure. Another feature of particular advantage and convenience is calibrated cylindrical screw cap member 64 internally threaded for mounting on externally threaded collar 38. This cap member allows fine adjustments in the stopping position of the quick-releasing nut being described.

FIGURE 4 shows an apparatus somewhat resembling that shown in FIGURES 2 and 3 but of a construction wherein lever arm 56a, pivotally mounted on block 54a and body 36a by means of pivot pins 52a and 55a respectively, is operated by pushing an extending portion 68 thereof to the left. Biased contact of arc-shaped threads 57a on block 54a is maintained with a feed screw in bore 40a by anchoring spring 62a mounted in operating cylinder 46a to lever arm 56a and body 36a respectively.

Referring to FIGURES 5 and 6 of the drawings, still another quick-release device embodying the instant invention is seen.

In this apparatus cylindrical threaded surface 100 of block 101 is held in contact with feed screw 16 in smooth bore 103 by a closed leaf spring 102 which is attached to block 101 by spring fasteners 104. Attachment of block 101 to spring 102 and confinement of the spring in slots 106 and 108 keep block 101 from rotating. Leaf spring 102 is housed in slots 106 and 108 but normally projects out of the unslotted sides 110 of body 112. When one manually applies pressure to the projecting spring portions 114 to force them toward body 112, force is transferred along spring 102 causing block 101 to be moved away from thread connection feed screw 16 and allowing rapid slidable adjustment of the feed screw through bore 103.

The quick releasable nut shown in FIGURE 7 includes the body 137 having a smooth walled bore 138 and having an elongated recess 139 normal to the bore 138. A block 141 is slideable in recess 139, by means of manually grippable handle means 142, the block having the threaded segment 143 for engaging the threads of the feed screw. Spring means 144 is mounted in recess 139 to bias the segments 143 into disengaged position relative to the threads of the feed screw. Preferably, locking or latching, means is provided, including a pair of relatively deep diametrical detent grooves such as at 145 and a pair of relatively shallow diametrical detent grooves such as at 146. A detent, or boss, 147, projects laterally from handle means 142, which, when seated in the deep grooves, as shown, locks the block 141 in disengaged position, and when turned angularly through 90° to be seated in the shallow grooves, locks the block 141 in threadedly engaged position. A suitable pin 148 cooperates with the reduced neck 149 of handle means 142 to make the block 141 fast to the handle rod 150. It will thus be seen that the locking, or latching means, positively locks the threaded segments into engagement with the threads of the feed screw and is free of dependence on the coil spring for holding the threaded block, or half nut, in engagement with the threaded feed screw.

From the foregoing descriptive matter it will be realized that applicants have provided new and useful apparatus of particular usefulness in the machine tool industry. However, such apparatus can also be used wherever quick release of threadably connected elements is desirable. One such use is in the assembly of components in which it is desirable to place, with geometrical precision, a number of elements. With an embodiment of the invention wherein a plurality of properly positioned smooth bores for receiving screws are present, one of said elements could be placed in each one of the bores and each element could be precisely and simultaneously released by retracting threadable blocks from each bore.

What is claimed is:

1. A quick release nut for use in a machine tool having a threaded feed screw, said nut being independent of attachment to the machine tool frame and adapted to be mounted on said feed screw, said nut comprising:

a compact metal body having a smooth-walled, axial, cylindrical bore therein for slidably receiving said threaded feed screw, an elongated smooth-walled cylindrical block receiving bore in said body having an axis normal to the axis of said feed screw bore and an elongated, smooth-walled, cylindrical spring-receiving bore in said body having an axis parallel to the axis of said block-receiving bore;

a cylindrical block slidably mounted in said block-receiving bore, said block having thread segments at the inner end thereof adapted to engage the threads of said feed screw and having an outer end;

a lever arm pivoted intermediate of its length to the outer end of said block, said arm having one end thereof pivotally mounted in said body and having a free opposite end;

a tension coil spring in said spring-receiving bore, said spring having one end fixed to a pin in said body and the other end thereof fixed proximate the other end of said lever arm for biasing said lever arm and block into thread engagement position and a hollow, operating cylinder slidably mounted in said spring receiving bore and encircling said spring, said cylinder having one end projecting from said body, with a push button thereon, having an axially extending slot intermediate of the length thereof receiving said spring pin and having the opposite end thereof abutting the free opposite end of said lever arm, for releasing said threaded block from the threads of said feed screw.

2. A quick release nut as specified in claim 1 wherein: said body is of square section and includes an integral, annular collar forming an extension of said axial bore and having threads externally thereof and a calibrated, cylindrical screw cap member threadedly mounted on said collar, for finely adjusting the stopping position of said nut on said feed screw.

References Cited

UNITED STATES PATENTS

| | | | |
|---|---|---|---|
| 1,241,258 | 9/1917 | Hawthorne | 77—34.7 X |
| 1,946,214 | 2/1934 | Kabigting | 77—34.4 |
| 2,746,497 | 5/1956 | Thompson | 82—4 X |
| 3,083,660 | 4/1963 | Rhindress | 82—4 |
| 3,145,401 | 8/1964 | Burg | 77—34.4 X |

FOREIGN PATENTS 1,377,503   9/1964   France.

LEONIDAS VLACHOS, *Primary Examiner.*